United States Patent
Dickinson et al.

(10) Patent No.: US 9,124,589 B2
(45) Date of Patent: *Sep. 1, 2015

(54) RSS FEED GENERATION USING OBJECTS

(71) Applicant: MICROSOFT TECHNOLOGY LICENSING, LLC, Redmond, WA (US)

(72) Inventors: Richard L Dickinson, Seattle, WA (US); Michaeljon Miller, Bellevue, WA (US)

(73) Assignee: MICROSOFT TECHNOLOGY LICENSING, LLC, Redmond ( * ) Notice: Subject to any disclaimer, the term of this patent is extended or adjusted under 35 U.S.C. 154(b) by 0 days.

This patent is subject to a terminal disclaimer.

(21) Appl. No.: 14/169,263

(22) Filed: Jan. 31, 2014

(65) Prior Publication Data

US 2014/0297789 A1 Oct. 2, 2014

Related U.S. Application Data

(63) Continuation of application No. 11/331,894, filed on Jan. 13, 2006, now Pat. No. 8,725,683.

(51) Int. Cl.
*G06F 17/30* (2006.01)
*H04L 29/08* (2006.01)
*G06Q 10/10* (2012.01)

(52) U.S. Cl.
CPC .......... *H04L 67/10* (2013.01); *G06F 17/3089* (2013.01); *G06F 17/30938* (2013.01); *G06Q 10/10* (2013.01)

(58) Field of Classification Search
None
See application file for complete search history.

(56) References Cited

U.S. PATENT DOCUMENTS

| | | |
|---|---|---|
| 6,507,856 B1 | 1/2003 | Chen et al. |
| 6,732,364 B1 | 5/2004 | Bhaskaran et al. |
| 6,772,216 B1 | 8/2004 | Ankireddipally et al. |
| 6,807,558 B1 | 10/2004 | Hassett et al. |
| 2002/0049749 A1 | 4/2002 | Helgeson et al. |
| 2002/0071153 A1* | 6/2002 | Boroditsky et al. ........... 359/123 |
| 2002/0087601 A1* | 7/2002 | Anderson et al. ............ 707/515 |
| 2004/0068509 A1 | 4/2004 | Garden et al. |

(Continued)

FOREIGN PATENT DOCUMENTS

| | | |
|---|---|---|
| WO | 0207013 | 1/2002 |
| WO | 2005089336 | 9/2005 |
| WO | 2005098675 | 10/2005 |

OTHER PUBLICATIONS

Angelius, Ladd, "Set Up a Simple Syndication Feed Using RSS", Feb. 6, 2003, <http://www.devx.com/xml/Article/10790>.
"AggregateFeeds", Aug. 13, 2003, <http://web.archieve.org/web/20030813041226/http://www.intertwingly.net/wiki/pie/AggergateFeeds>, (author unknown).
Winer, Dave, "RSS 2.0 Specification", Jul. 15, 2003, <http://cyber.law.harvard.edu/rss/rss.html>.

(Continued)

*Primary Examiner* — Son T Hoang
(74) *Attorney, Agent, or Firm* — Damon Rieth; Aaron Hoff; Micky Minhas

(57) ABSTRACT

A really simple syndication (RSS) feed generator provides a set of data related to an entity to a user in the form of a really simple syndication (RSS) feed in a manner so that the set of data includes entity information at the feed-level. A user of the RSS feed may use the feed-level entity information to consume the set of data in a number of different ways. In an embodiment, the feed-level entity information includes metadata defining the entity such that a user may use the metadata to display the entity on the client side. The RSS feed generation system allows a user to manipulate a copy of an instance of entity data as necessary for a client.

16 Claims, 7 Drawing Sheets

(56) References Cited

U.S. PATENT DOCUMENTS

| | | |
|---|---|---|
| 2004/0158455 A1 | 8/2004 | Spivack et al. |
| 2004/0225749 A1 | 11/2004 | Pavlik et al. |
| 2005/0015439 A1 | 1/2005 | Balaji et al. |
| 2005/0038717 A1 | 2/2005 | McQueen et al. |
| 2005/0043940 A1 | 2/2005 | Elder |
| 2005/0075097 A1 | 4/2005 | Lehikoinen et al. |
| 2005/0131750 A1 | 6/2005 | Kogan et al. |
| 2005/0165615 A1 | 7/2005 | Milnar |
| 2005/0182695 A1 | 8/2005 | Lubow et al. |
| 2005/0198021 A1 | 9/2005 | Wilcox et al. |
| 2005/0216439 A1 | 9/2005 | Kawakita |
| 2005/0267973 A1 | 12/2005 | Carlson et al. |
| 2006/0031228 A1 | 2/2006 | Bosworth et al. |
| 2006/0173985 A1* | 8/2006 | Moore .......................... 709/223 |
| 2006/0248209 A1 | 11/2006 | Chiu et al. |
| 2007/0078904 A1 | 4/2007 | Yoon et al. |
| 2007/0094365 A1* | 4/2007 | Nussey et al. ................ 709/223 |
| 2007/0156809 A1 | 7/2007 | Dickinson et al. |
| 2007/0168461 A1 | 7/2007 | Moore |
| 2007/0220016 A1 | 9/2007 | Estrada et al. |
| 2008/0137688 A1 | 6/2008 | Walsh |

OTHER PUBLICATIONS

Burke, "Making RSS Pretty", Jun. 25, 2004, <ttp://web.archieve.org/web/20040625214249/http://interglacial.com/~sburke/stuff/pretty_rss.html>.

Hammond et al.,"The Role of RSS in Science Publishing—Syndication and Annotation on the Web", <http://dlib.org/dlib/december04/hammond/12hammond .html>.

Berlind, David, "What's Wrong with RSS is Also What's Right With It", <http://news.zdnet.com/2100-9588_22-5482204.html> Dec. 7, 2004.

Leib, Rebecca, "Real-life RSS Marketing", <http://clickz.com/experts/brand/buzz/atricle.php/3517006> Jul. 1, 2005.

Wallis, R., "Talis White Paper: Personalised RSS for Library—User Interaction", <http://www.talis.com/research/research/rss/rss_whitepaper.pdf>, Feb. 2005.

Santos, Addy, "Introducing BlogWave!", Santomania, Jul. 7, 2004, Addys, <http://blogs.msdn.com/asanto/archieve/2004/07/21/190667.aspx>.

"Urchin RSS Aggregator", Version 9.2, <http://urchin.sorgeforce.net/.> (Author unknown).

"Traction Teampage and Communicator Features," Traction Software, Inc., 2005, <http://tractionsoftware.com/prd_features.html>, (Author unknown).

* cited by examiner

RSS FEED GENERATION USING OBJECTS

The present application claims benefit of U.S. patent application Ser. No. 11/331,894, entitled "RSS Feed Generator" and filed on Jan. 13, 2006, which is specifically incorporated by reference for all that it discloses and teaches.

BACKGROUND

Computers and computer software make up a very important part of modern life and business. In today's business environment, for any organization to stay competitive, it is imperative that it uses computers and software applications to manage data, customers, employees, finances, etc. Business processes and workflows are typically managed using multiple forms of communications and organization. One method used by business organizations to exchange data with their partners, customers, etc., is by use of websites to publish relevant information. Web sites and other types of interactive systems commonly host electronic catalogs for assisting users in locating and evaluating various types of items. The items may, for example, include physical products, journal articles, movie and music titles, downloadable software, services, stock assets, businesses, and/or any other type of item that may be represented in a database. Electronic catalog systems also commonly support the ability for users to conduct various types of item-related transactions, such as purchasing an item, downloading an item, or selling an item.

However, current business systems do not have an easy way to update data and share data with users and other systems without implementing significant integration between various systems. Generally speaking, business data is typically stored securely behind a proprietary application interface or in a proprietary database. Access methods are available for application developers that allow them to build data-level integration and data-access applications. However, designing such data-level integration and data-access applications puts the burden on the end user to clearly specify which business data they need access to, how often they need it, and in what format. Given the information technology (IT) departments' development backlogs it is unlikely that an internal salesperson, let alone an external supplier, will ever see this data feed produced.

Typical solutions for implementing closer data integration include ad hoc query tools, ad hoc reporting tools, and direct database access. However, there are three important problems to keep in mind with respect to such ad hoc solutions. First, a typical user doesn't have the necessary skills to create these queries and reports. This problem puts us back in the IT pipeline. Second, a semi-skilled user has enough knowledge to be extremely dangerous to the application as a whole. There's usually nothing stopping the user from constructing such expensive queries that the application goes to its knees. And third, such ad hoc solutions only work for internal users. There's still no solution for external users to get secure access to the business data. Therefore, it is necessary to provide a simpler web service model that allows efficient sharing and updating of data between various business entities.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A really simple syndication (RSS) feed generator provides a set of data from a database or other data source to a user in the form of a really simple syndication (RSS) feed in a manner so that the set of data includes entity information at the feed-level. A user of the RSS feed may use the feed-level entity information to consume the set of data in a number of different ways. In an embodiment, the feed-level entity information includes metadata defining the entity such that a user may use the metadata to display the entity on the client side. The RSS feed generation system allows a user to manipulate a copy of an instance of entity data as necessary for a client.

An alternate embodiment of the RSS feed generator allows embedding an extensible stylesheet (XSL) processing instruction in the RSS feed data in extensible markup language (XML) form. A client using such RSS feed data may organize or view the data using the embedded processing instructions. For example, using such an RSS feed generator a customer relationship management (CRM) software application may provide up-to-date information about various clients to a number of partners in a supply chain.

In an alternate embodiment of the RSS feed generator, a consumer of the instance data may include a serialization module that may be used to serialize an instance data for the entity and an addition module that may be used to attach the serialized instance data to an RSS feed. Subsequently, when a user receives the RSS feed from the consumer, the user may de-serialize the serialized instance data to create a user side proxy using the de-serialized entity instance data. Yet alternatively, the user may process the de-serialized entity instance data as necessary and generate a secondary RSS feed using such processed entity instance data in a manner so that it may provide a third party user access to such processed entity instance data.

BRIEF DESCRIPTION OF DRAWINGS

The present patent is illustrated by way of examples and not limitations in the accompanying figures, in which like references indicate similar elements, and in which.

DETAILED DESCRIPTION

Although the following text sets forth a detailed description of numerous different embodiments, it should be understood that the legal scope of the description is defined by the words of the claims set forth at the end of this patent. The detailed description is to be construed as an example only and does not describe every possible embodiment since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Network

Figure 1:
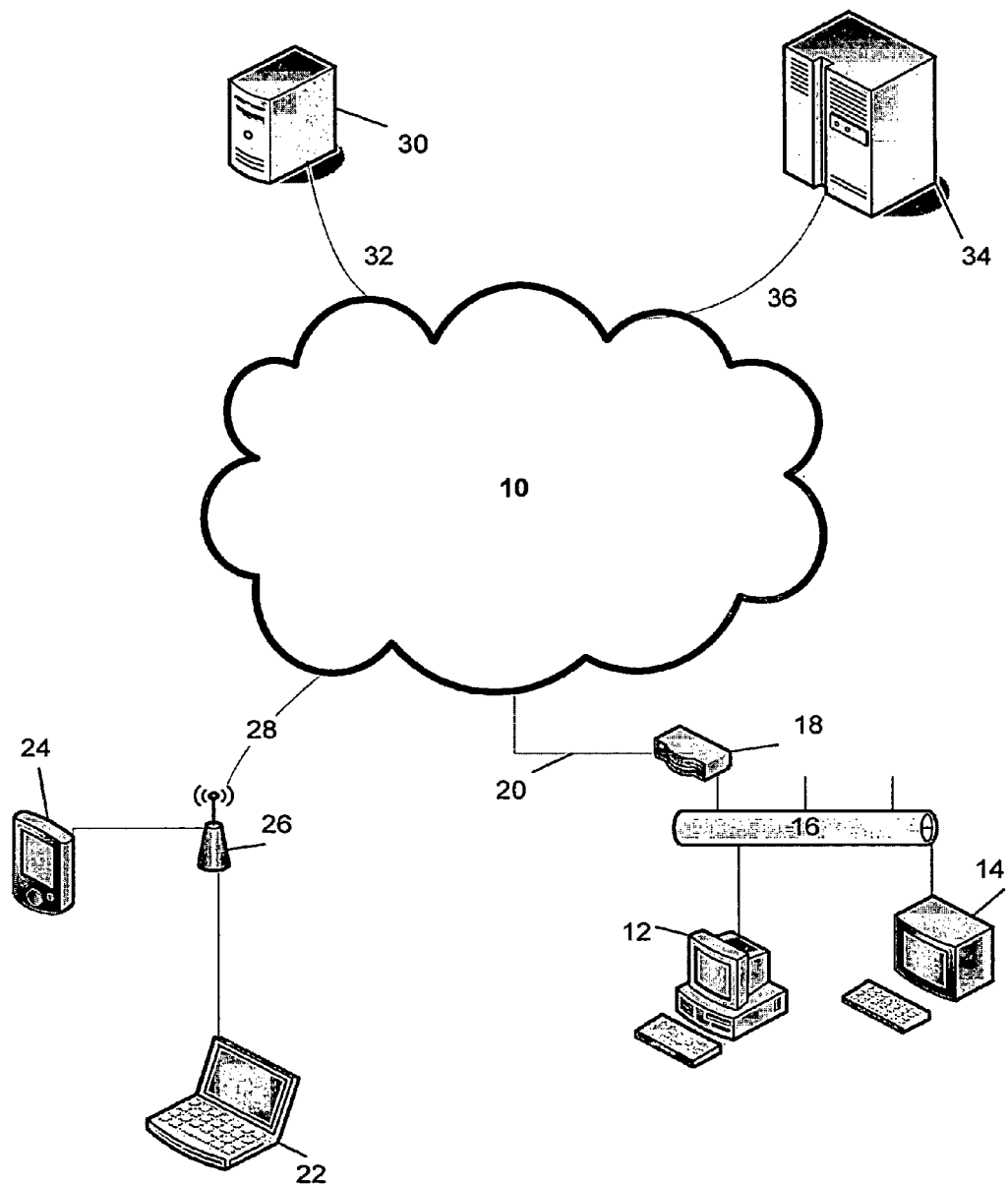
FIG. 1 is an example block diagram of a network interconnecting a plurality of computing resources.

FIG. 1 illustrates a network 10 that may be used to implement a RSS feed generator described herein. The network 10 may be the Internet, a virtual private network (VPN), or any other network that allows one or more computers, communication devices, databases, etc., to be communicatively connected to each other. The network 10 may be connected to a personal computer 12 and a computer terminal 14 via an Ethernet 16 and a router 18, and a landline 20. On the other hand, the network 10 may wirelessly connected to a laptop computer 22 and a personal data assistant 24 via a wireless communication station 26 and a wireless link 28. Similarly, a server 30 may be connected to the network 10 using a communication link 32 and a mainframe 34 may be connected to the network 10 using another communication link 36. As it will be described below in further detail, one or more components of the RSS feed generator may be stored and operated on any of the various devices connected to the network 10. For example, the RSS feed generator described in here may include the program code for defining scope and attributes of an object to be included in the RSS feed on the mainframe 34 while the program code for converting an RSS XML feed into XML schema definition format may be implemented on the personal computer 12.

Computer

Figure 2:
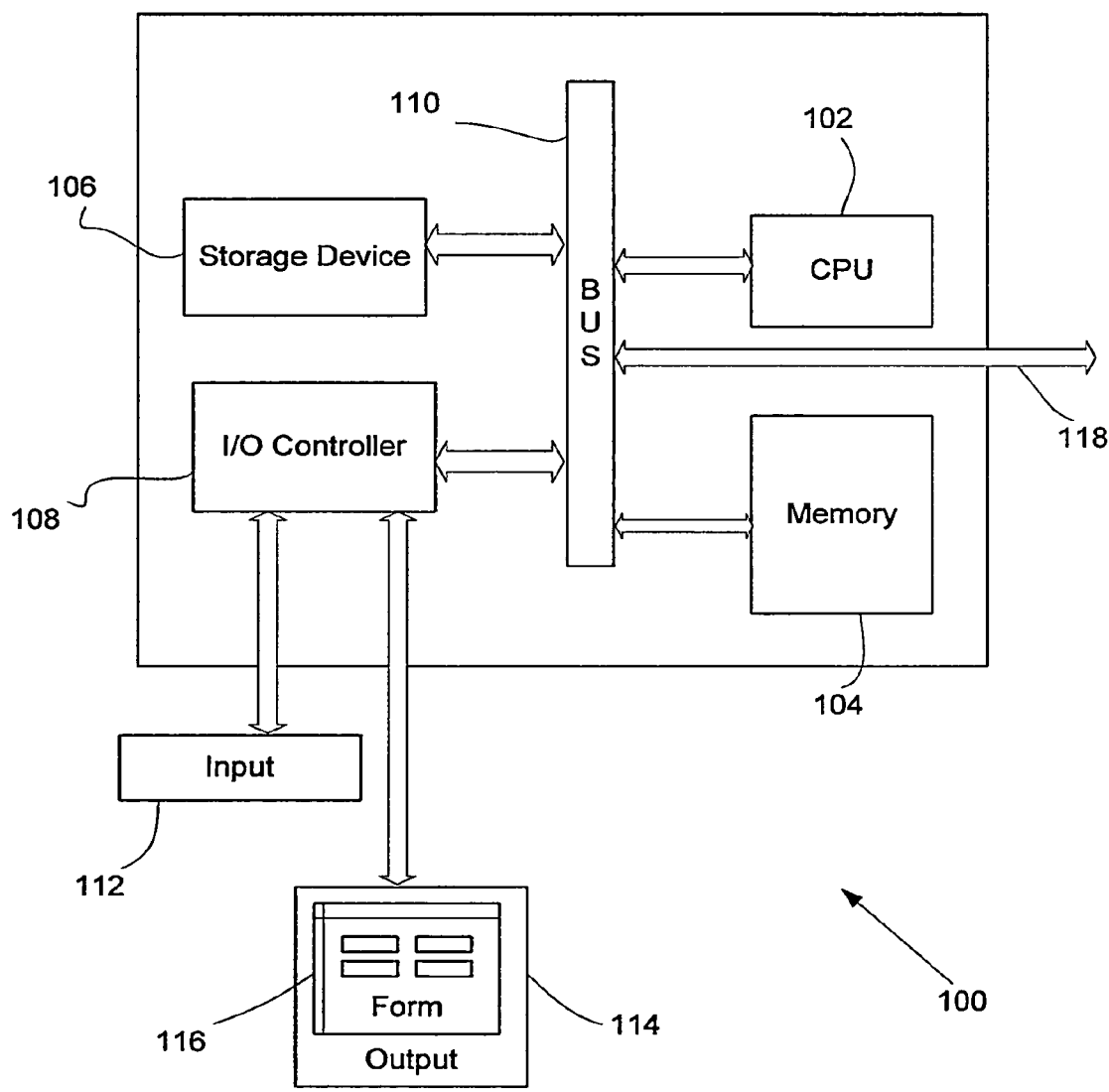
FIG. 2 is an example block diagram of a computer that may be connected to the network of FIG. 1.

FIG. 2 illustrates a computing device in the form of a computer 100 that may be connected to the network 10 and used to implement one or more components of a RSS feed generator described herein. Components of the computer 100 may include, but are not limited to a central processing unit (CPU) 102, a memory 104, a storage device 106, an input/output controller 108, and a system bus 110 that couples various system components including the memory to the CPU 102. The system bus 110 may be any of several types of bus structures including a memory bus or memory controller, a peripheral bus, and a local bus using any of a variety of bus architectures.

The memory 104 may include computer storage media in the form of volatile and/or nonvolatile memory such as read only memory (ROM) and random access memory (RAM). A basic input/output system (BIOS), containing the basic routines that help to transfer information between elements within computer 110, such as during start-up, is typically stored in ROM. RAM typically contains data and/or program modules that are immediately accessible to and/or presently being operated on by processing unit 120. The memory 104 may also be used to store data related to one or more programs codes used by the computer 100 and/or the RSS feed generator.

The storage device 106 may typically include removable/non-removable, volatile/nonvolatile computer storage media. By way of example only, the storage device 106 may include a hard disk drive, a magnetic disk drive, nonvolatile magnetic disk 152, an optical disk drive, etc. One or more of the forms stored on the memory 104 may be populated using data stored on the storage device 106. The I/O controller may be used by the computer 100 to communicate with an input device 112, which may be a keyboard, a mouse, etc., an output device 114, which may be a monitor, a printer, etc.

RSS Feed Generator System

Figure 3:
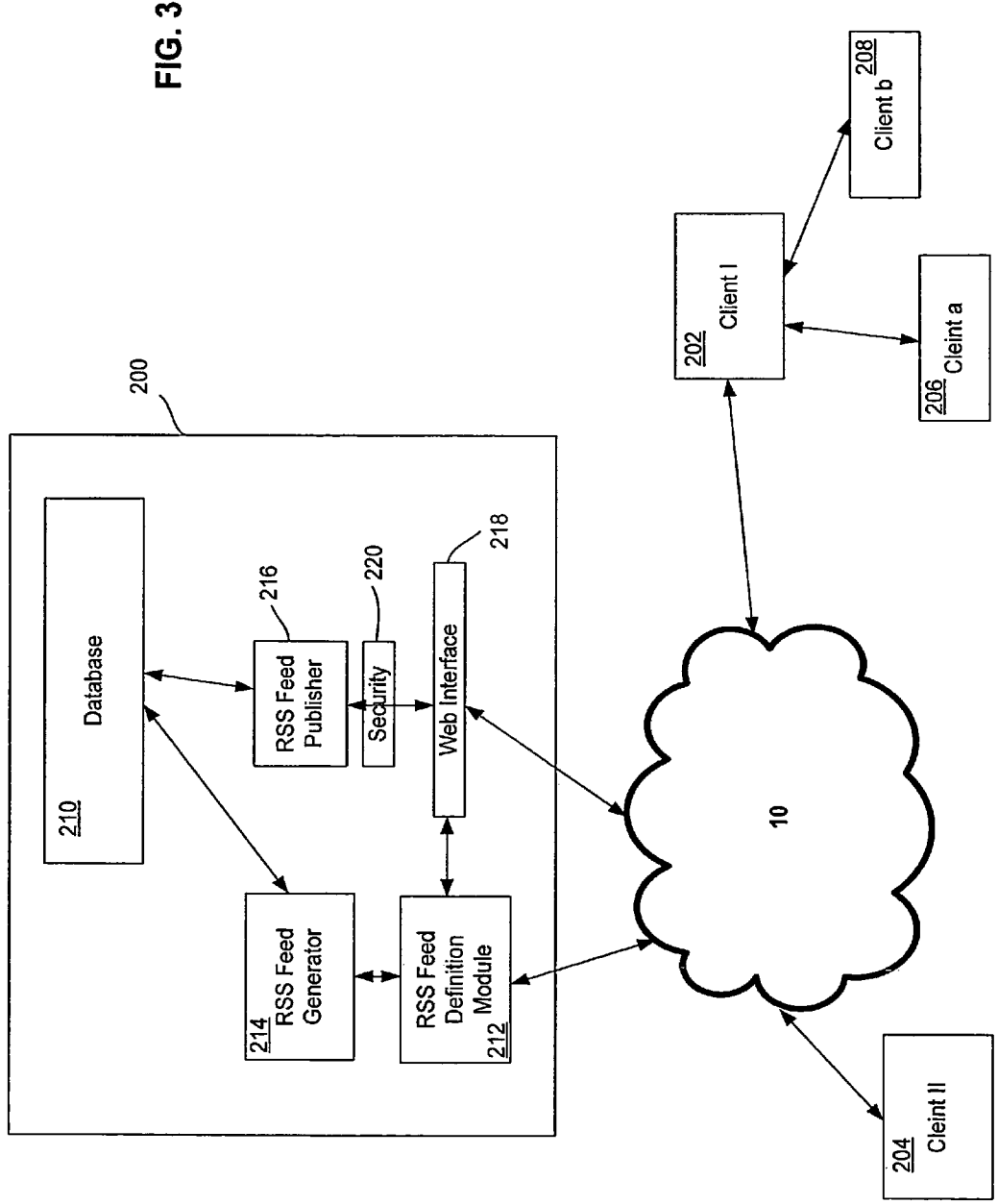
FIG. 3 illustrates an example block diagram of a RSS feed generation system.

Really simple syndication (RSS) is a family of XML file formats for Web syndication used by, among other things, news websites and web-logs. The term RSS is also known as abbreviation of rich site summary or resource description framework (RDF) site summary. Notwithstanding the term used, the RSS technology allows Internet users to subscribe to websites that have provided RSS feeds. FIG. 3 is an illustration of a RSS feed provider system 200, which may be implemented on the network 10. The RSS feed provider system 200 provides RSS feed to a number of clients 202-204 based on data located on the RSS feed provider system 200. Note that while in FIG. 3, all of the various components of the RSS feed provider system 200 are shown to be implemented on a single node on the network 10, in an alternate implementation, the various components may be located on different nodes on the network 10. Moreover, some of the components of the RSS feed provider system 200 may also be implemented on the nodes hosting the clients 202-204.

The RSS feed provider system 200 includes a database 210, an RSS feed definition module 212, an RSS feed generator 214, an RSS feed publisher 216, a web interface 218 and a security module 220. One or more of the modules 210-220 may be omitted in an alternate embodiment of the RSS feed provider system 200. Alternatively, one or more of the modules 210-220 may also be combined into one another, for example, the RSS feed generator 214 and the RSS feed definition module 212 may be combined into one module. As one of ordinary skill in the art would recognize, any of the various modules 210-220 may be implemented using software, hardware, firmware, or any combination thereof.

Moreover, one or more of the modules 210-220 may be implemented as part of other well known applications. For example, the database 210 may be part of a customer relation management (CRM) application, the web interface 218 may be part of a web hosting software application, the RSS feed definition module 212 may be part of an online accounting software, etc.

The database 210 may be any of the various database used by an entity that provides RSS feed of the data from the database 210. For example, the database 210 may be a (CRM) database, a human resources (HR) database, an accounting database, etc. The clients 202-204 may request RSS feed by communicating with the web interface module 218 via the network 10, such as the Internet, etc. The web interface module 218 may be implemented by using any of the well known web interface that may interact with various back-end applications. An example of such a web interface module 218 may be designed using a common gateway interface (CGI) software, etc.

Upon receiving RSS data feed from the RSS feed provider system 200, the clients 202-204 may make such feeds available to other clients, such as clients 206-208. Before making the RSS feed available to clients 206-208, the client 202 my further process the RSS feed. For example, the client 202 may sort the results of the RSS feed, restrict certain parts of the RSS feed from viewing by the clients 206-208, add further data to the RSS feed, etc. Moreover, the client 202 may employ its own version of the RSS feed provider system 200 to generate and communicate RSS feed to its clients 206-208. As one of ordinary skill in the art would recognize, multiple level nesting of such RSS feeds may be implemented.

Figure 4:
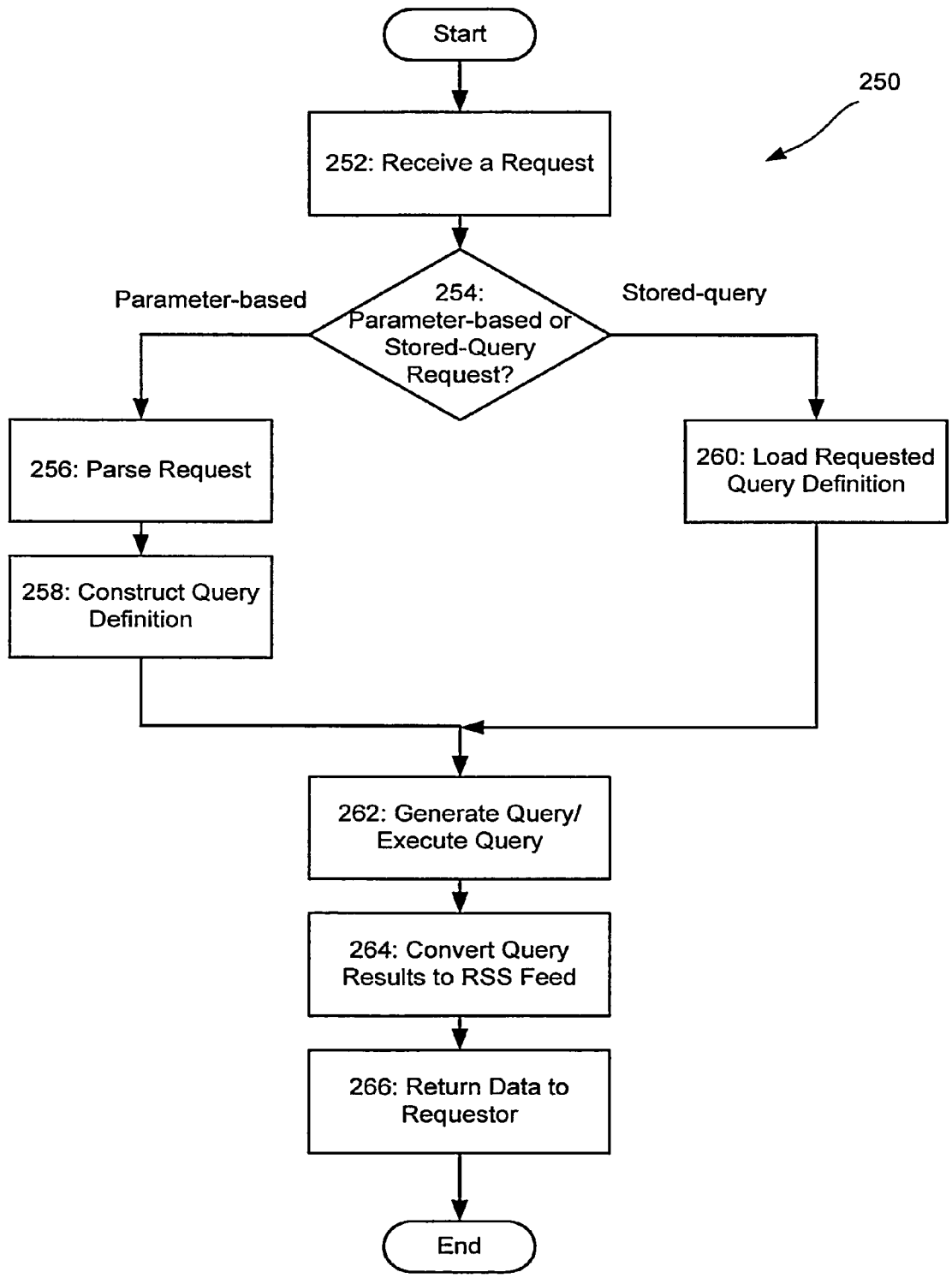
FIG. 4 is an example flowchart of an RSS feed generation program that may be used by the RSS feed generation system.

Now referring to FIG. 4, an example flowchart illustrates functioning of a RSS feed generation program 250 that may be used by the RSS feed provider system 200. The RSS feed generation program 250 may be implemented using one or more of the various modules of the RSS feed provider system 200. The RSS feed generation program 250 may be initiated in response to a request for RSS feed from one of the clients 202-204 or it may be initiated by any module of the RSS feed provider system 200. For example, in an implementation, the RSS feed generation program 250 may be initiated by the RSS feed generator 214 in response to a clock signal, in response to an update to the database 210, etc. The RSS feed generation program 250 may be implemented on the memory 104 of the computer 100 in form of software or alternatively in the form of hardware, firmware or any combination thereof.

Now referring to the flowchart of the RSS feed generation program 250, a block 252 receives a request to generate an RSS feed based on data from the database 210. Such a request may be received from the clients 202-204 via the network 10 at the web interface 218. Such a request received at the web interface 218 may have various parameters of the requested feed included in it. Alternatively, the web interface module 218 may direct the request to the RSS feed definition module 212 to further assist in generating a feed definition. In an embodiment of the RSS feed provider system 200, client specific feed definitions may be stored on the RSS feed definition module 112.

The RSS feed definition module 212 may interact with the client requesting the RSS feed using the network 10 in a number of different manners. For example, in a particular embodiment, the RSS feed definition module 212 may request the scope and/or the attributes of the object that is requested by the client. The scope of the object requested by the client may include the number of data fields, an identification of the data source providing the data fields, the names of the data fields, etc. Various attributes of the requested object may include information about which fields are to be sortable, the update time for the field values, etc. For example, the RSS feed request may have a time stamp attached to it specifying the last time the requested object was received and therefore any updates to the object from that time may need to be provided in the RSS feed containing the object.

Subsequently, at a block 254, the RSS feed definition module 212 determines if the request received at block 252 is a parameter-based request or a stored-query based request. If it is determined that the request is a parameter-based request, at a block 256 the RSS feed definition module 212 parses the parameter-based request and constructs a query definition at a block 258. If it is determined that the request is stored-query based, at a block 260, the RSS feed definition module 212 loads the requested query definition.

The RSS feed definition module 212 may generate the query definition using a number of different methods, including, but not limited to, by using a user interface, by using a web based application programming interface, or by using an hypertext transfer protocol (HTTP) request. For example, the RSS feed definition module 212 may provide a user interface that may be activated by the client requesting the RSS feed where the client may define the scope and the attributes of the requested object by making various selections on the user interface or by inputting information in the user interface.

Figure 5:
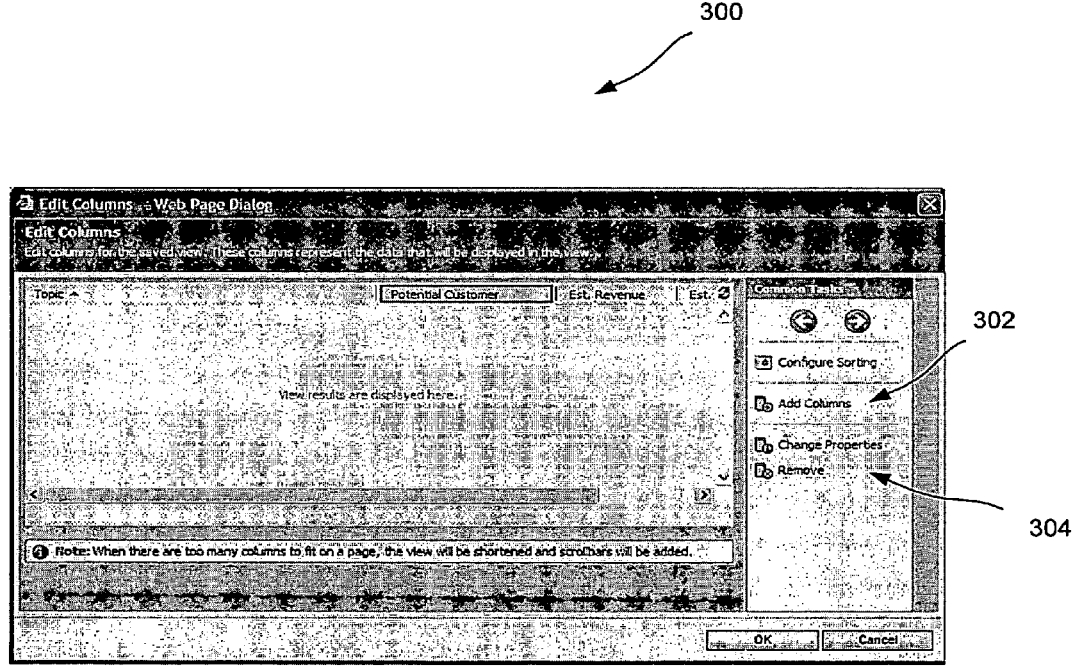
FIG. 5 is an example filter definition screen that may be used by the RSS feed generation program to define a feed definition.

An example of such a user interface is illustrated by a column customization dialog interface 300 illustrated in FIG. 5. The column customization dialog interface 300 allows users to define which columns are to be included in the RSS feed generation definition. For example, a user may add a field to be included in the RSS feed by selecting the column for that field using the "Add Columns" button 302 of the column customization dialog interface 300. Similarly, a user can remove a selected field by highlighting the field to be removed and then selecting the "Remove" button 304 of the column customization dialog interface 300.

Alternatively, the RSS feed definition module 212 may provide an application programming interface (API) that receives definition of a query/feed, as provided by a client requesting an object, and converts the definition into the format that can be used by the RSS feed definition module 212. Yet, alternatively, the RSS feed definition module 212 may receive the object definition in an HTTP document and extract the object definition from such an HTTP document.

After the generation of the feed definition, at a block 262, the RSS feed definition module 212 may generate an RSS feed with the requested object by converting the feed definition into the RSS feed. To convert the RSS feed definition into an RSS feed, the RSS feed definition module 212 may define and execute a query on the database 210, where the query is defined using the feed definition. The RSS feed definition module 212 may use a number of predefined query parameterization and construction routines to define the query from the feed definition.

Subsequently, at a block 264, the RSS feed definition module 212 may convert the query results into the RSS feed. There are currently seven RSS formats, of which three formats are widely used and converting results of a query into RSS feed conforming to any of these formats is well known to one of ordinary skill in the art.

At a block 266, the RSS feed definition module 212 may provide the RSS feed to the client requesting the RSS feed. Providing the RSS feed to the client may comprise exposing the RSS feed as a web page using the web interface 218. Alternatively, the web interface 218 may convert the RSS feed into RSS XML data, generate an RSS feed uniform resource locator (URL) for the RSS XML data and communicate the RSS feed URL to the client requesting the RSS feed. The client may incorporate the RSS feed URL into its own web page to expose the query results underlying the RSS feed. Because the RSS feed is constructed as an object with various sortable attributes provided to the client, the client may also sort the data contained in the RSS feed, generate different views based on the RSS feed and/or perform its own queries on the data contained in the RSS feed.

Figure 6:
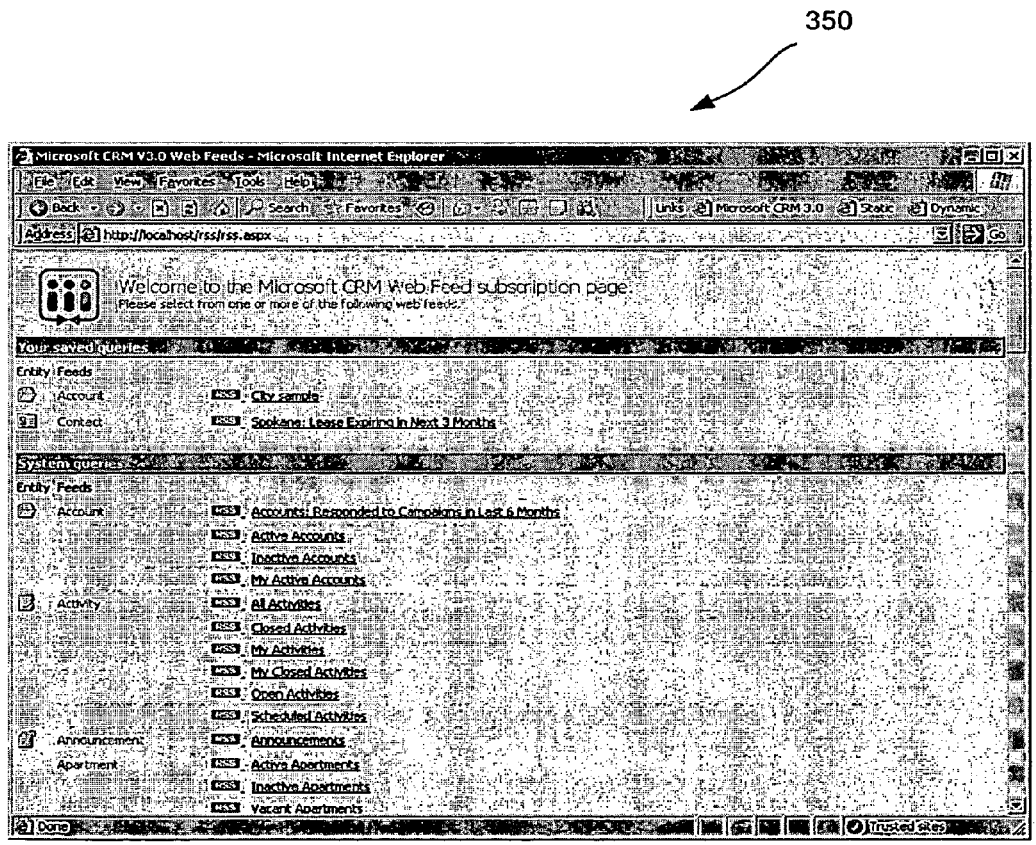
FIG. 6 illustrates an example RSS web feed subscription page that may be used by clients to view various RSS feeds available from an application.

In an alternate embodiment, the RSS feed generator 200 may expose various RSS feeds available to a client as a web page. Such a web page may display only those feeds to a client for which the client has a permission to view. FIG. 6 illustrates an RSS web feed subscription page 350 that may be used by clients to view various RSS feeds available from a CRM application.

This feature is specifically useful to clients using the RSS feeds to perform various operations. Especially, given the prevalence of RSS readers build into various Internet browsers and the RSS platform built into various operating systems, the RSS feeds provides clients with the choice to combine a query construction model, RSS feed generation model, and a query execution models into one produce. Such a combined product may allow users to construct queries of the business data that they're interested in and access those queries as RSS feeds from any device or application that supports RSS. Such a combined product may also allow a user operating a database to create a query specific to a particular partner or supplier, share that query as a publication, and let the partner or supplier have direct access to data necessary to keep the supply chain full.

As one of ordinary skill in the art would appreciate, not all the blocks of the RSS feed generation program 250 need to be performed for a given implementation of the RSS feed provider system 200. As some of the blocks of the RSS feed generation program 250 may be used primarily to increase the efficiency of the RSS feed generation program 250, one or more such blocks may be omitted in a given implementation without affecting the functionality of the RSS feed provider system 200. Moreover, one or more of the blocks in the RSS feed generation program 250 may also be implemented in an alternate order without affecting the functionality of the RSS feed provider system 200.

Moreover, when the RSS feed is defined it may be bound to a particular type of business entity. Generally speaking business entities in various applications carry several levels of metadata, such as the attribute definitions, attribute validation, display information, etc. Such metadata information can be packaged and used in a more compact fashion as part of the RSS feed to indicate to the client the type of object exposed on this feed, and its current definition.

Figure 7:
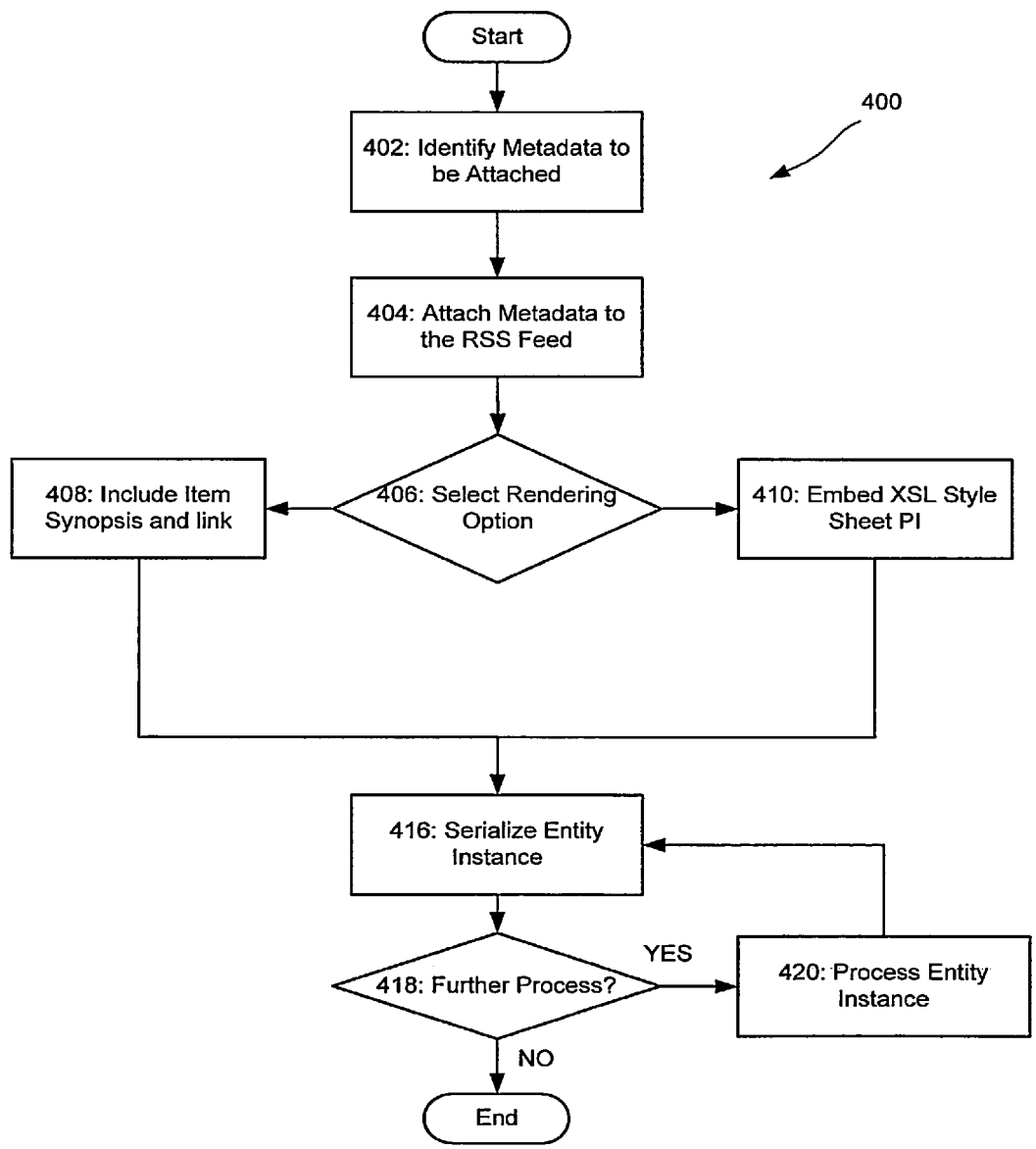
FIG. 7 illustrates an example flowchart of a feed-level entity data addition program that may attach feed-level entity information to the RSS feed.

FIG. 7 illustrates an example flowchart of a feed-level entity data addition program 400 that may be used to attach feed-level entity data to the RSS feed generated by the RSS feed generator program 250. The feed-level entity data addition program 400 is illustrated as attaching various metadata related to the entity for which the RSS feed is generated. A block 402 may identify various metadata related to the entity for which the RSS feed is generated. As discussed above, depending on the entity, the metadata may include attribute definitions for various items of the entity, validation rules for such attributes, entity display information, etc.

The below XML fragment shows an example of a sample of entity metadata that can be provided for the RSS feed of an entity. TABLE-US-00001 <crms:entity name="account" display="Account" otc="1"> <attribute name="name" display="Account Name" type="crms: String"/> <attribute name="telephone1" display="Main phone" type="crms: String"/> <attribute name="address1_city" display="Address 1: City" type="crms:String"/> . . . <attribute name="statecode" display="Status" type="crms: State"/> <attribute name="statuscode" display="Status reason" type="crms:Status"/> </crms:entity>

Subsequently, a block 404 attaches the identified feed-level metadata information with the RSS feed. Note that this is RSS feed-level information and only needs to be specified once for the RSS feed for the entire entity, not for each individual instance of the entity or with each individual update of the RSS feed. Moreover, this feed-level information does not change per item. The types mentioned in the metadata are the same types as those exported from any web interface associated with the database form which the RSS feed is generated. Each of the RSS feed items may carry with it enough metadata, as attached to the RSS feed, to provide a reasonably rich client-side display.

There are a number of various manners in which the metadata attached to the RSS feed may make rendering the RSS feed at the user side available. The feed-level entity data addition program 400 illustrates three of such rendering options. Specifically, a block 406 determines which of the three rendering options are to be selected for a particular RSS feed. Note that the feed-level entity data addition program 400 provides the three rendering options as separate stand-alone choices, in an alternate embodiment, a combination of one or more of these options may be used to provide rendering the entity data on client side.

The block 406 may determine that the <description> element should include a short, text-based (sometimes hypertext markup language (HTML) based) introduction or synopsis of the item. In such a case, a block 408 includes a <link> element to the item, wherein the <link> element indicates to a client where to find the complete document specified in the item. Providing such a link to the client leaves all rendering to the client and requests a user to follow the <link> URL to read the entire document specified in the item.

Alternatively, the block 406 may determine to embed an XSL (extensible style sheet language) style sheet processing instruction (PI) into the RSS XML data for rendering purpose. In such a case, a block 410 embeds such an XSL style sheet PI into the RSS XML data sent to the client by the RSS feed generator program 250. In this case, clients that honor this PI can then leave the ultimate rendering of the layout and display up to the RSS feed provider.

One of the drawback of this method may be that in such a case, the provider has to determine client rendering capabilities, such as display width, available user input devices, etc. Moreover, the RSS feed provider is also responsible for providing any smart style sheet necessary for rendering the RSS feed. On the other hand, using the RSS feed provider display model allows the RSS feed provider to embed additional information into the <item> where such information may be interesting only to the XSL transform. In such a situation a request for RSS feed may include enough metadata to determine which XSL PI should be-included for rendering the RSS feed. Identifying the device to be used to render the RSS feed may allow determining such rendering capabilities.

Yet alternatively, the block 406 may determine to extend the RSS feed in a standard way. In such a case, a block 412 may send an actual entity instance data, as generated by an application working with the RSS feed generator 200, such as a CRM application, to a client requesting the RSS feed. In this case, first the block 412 may receive entity instance data from the application working with the RSS feed generator 200 and then serialize such entity instance data before sending the serialized data to the client. De-serializing and serializing data is well-known to those of ordinary skill in the art and therefore not described in further detail here. For example, when the entity instance data sent with the RSS feed is related to a CRM application, the entity instance data may be publicly described using industry standard XML schema definition (XSD) standard in a manner so that it can be de-serialized by any client capable of consuming a CRM web service definition language (WSDL) and creating a client-side proxy.

At a block 414, the RSS feed including the serialized entity instance data is received at a client. Subsequently, at a block 416, the client may de-serialize the serialized data before displaying the entity instance data. Moreover, the client may also perform further processing on the de-serialized entity instance data, create a client side proxy using the de-serialized entity instance data, etc. Thus a block 418 determines if further processing of the entity instance data is necessary. If such processing is necessary, a block 420 performs such further processing and control is transferred back to block 416.

Providing entity instance data to the client allows the client now to be able to get a copy of the instance data for the entity in question and to manipulate that data in any way necessary.

The ultimate client of the RSS feed doesn't necessarily have to be the client machine receiving the RSS feed and running an aggregator process. In fact, the ultimate client may be a series of processes in a pipeline that massage and route the data contained in the RSS feed to various consumers. An example might be an order routing system in a hub and spoke supply chain.

In such a case, an RSS feed client may read the RSS feed and apply local business rules to determine the ultimate consumer for the data from the RSS feed. Furthermore, as one of ordinary skill in the art would appreciate, such capability to disseminate the RSS feed data may be replicated further downstream in a manner so that each downstream consumer has the option to apply local business rules to the RSS feed data. Such capability allows developers at each of the various levels to build powerful feed processing pipeline. For example a developer at a given level may apply an algorithm with multiple forks, branches, etc., so as to manipulate the RSS feed data as per his or her own business needs.

As one of ordinary skill in the art would appreciate, not all the blocks of the feed-level entity data addition program 400 need to be performed for a given implementation of the RSS feed provider system 200. As some of the blocks of the feed-level entity data addition program 400 may be used primarily to increase the efficiency of the feed-level entity data addition program 400, one or more such blocks may be omitted in a given implementation without affecting the functionality of the RSS feed provider system 200. Moreover, one or more of the blocks in the feed-level entity data addition program 400 may also be implemented in an alternate order without affecting the functionality of the RSS feed provider system 200.

Although the forgoing text sets forth a detailed description of numerous different embodiments of the invention, it should be understood that the scope of the invention is defined by the words of the claims set forth at the end of this patent. The detailed description is to be construed as example only and does not describe every possible embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

What is claimed is:

1. A method for generating data feeds, the method comprising:
   receiving, in a customer relationship management (CRM) application at a first computing device, a request from a CRM application client at a second computing device to transmit a CRM program object to the CRM application client via a Really Simple Syndication (RSS) feed, the CRM program object comprising a set of data from a CRM database accessible by the CRM application, the set of data related to a business entity of a CRM system;
   defining scope and attributes of the CRM program object from the request, wherein
      the scope comprises a number of data fields, an identification of a data source providing the data fields, and names of the data fields of the set of data from the CRM database and
      the attributes comprise information about which of the data fields are sortable, and update times for field values of the set of data from the CRM database;
   generating a feed definition using the defined scope and the defined attributes of the set of data;
   converting the feed definition to the RSS feed by defining a query based on the feed definition, obtaining query results via executing the query on the CRM database and converting the query results in a serialized format to the RSS feed;
   identifying feed-level information comprising a set of metadata indicating a type and current definition of the CRM program object, the set of metadata comprising attribute definitions, validation rules, and display information for the business entity;
   attaching the feed-level information to the RSS feed;
   transmitting the RSS feed to the CRM application client as a serialized object having sortable attributes; and
   providing an interface from the CRM application on the first computing device to the CRM application client on the second computing device, the interface to receive selections of which CRM data to include in the RSS feed.

2. The method of claim 1, wherein the business entity is at least one of: a record of a business system; an entity in a business system; and a row in a database.

3. The method of claim 1, wherein the set of metadata includes display parameters used to display the business entity on user side.

4. The method of claim 3, wherein the set of metadata includes a description element comprising:
   an item identifier identifying an item of the business entity;
   a hypertext markup language based synopsis of the item; and
   a link element that allows a user to link to the item.

5. The method of claim 4, further comprising linking to the item using the link element and displaying the item using the display parameters.

6. The method of claim 1, further comprising embedding an Extensible Stylesheet Language (XSL) style sheet processing instruction in the feed-level information.

7. The method of claim 1, further comprising:
   de-serializing entity instance data from the CRM program object; and
   embedding the de-serialized entity instance data in the feed-level information.

8. The method of claim 7, further comprising:
   serializing the de-serialized entity instance data; and
   creating a client side proxy using the serialized entity instance data.

9. The method of claim 7, further comprising:
   receiving the de-serialized entity instance data;
   serializing the de-serialized entity instance data;
   processing the serialized entity instance data;
   generating a secondary RSS feed using the processed data; and
   providing a user a link to the secondary RSS feed.

10. An article of manufacture for generating data feeds using objects comprising a computer readable hardware medium having embodied therein instructions that when executed, cause a system to:
   receive, in a customer relationship management (CRM) application at the computing device, a request from a CRM application client at a second computing device to transmit a CRM program object to the CRM application client via a Really Simple Syndication (RSS) feed, the CRM program object comprising a set of data from a CRM database accessible by the CRM application, the set of data related to a business entity of a CRM system;

define scope and attributes of the CRM object, wherein
the scope comprises a number of data fields, an identification of a data source providing the data fields, and names of the data fields of the set of data from the CRM database and
the attributes comprise information about which of the data fields are sortable, and update times for field values of the set of data from the CRM database;

generate a feed definition using the defined scope and the defined attributes of the set of data;

generate the RSS feed in the CRM application via converting the feed definition to the RSS feed by defining a query based on the feed definition, obtaining query results via executing the query on the CRM database and converting the query results in a serialized format to the RSS feed;

identify feed-level information comprising a set of metadata indicating a type and current definition of the CRM program object, the set of metadata comprising attribute definitions, validation rules, and display information for the business entity;

attach the feed-level information to the RSS feed;

transmit the RSS feed to the CRM application client as a serialized object having sortable attributes; and provide an interface from the CRM application on the first computing device to the CRM application client on the second computing device, the interface to receive selections of which CRM data to include in the RSS feed.

11. The article of claim 10, wherein the business entity is at least one of: a record of a business system; an entity in a business system; and a row in a database.

12. The article of claim 10, wherein the set of metadata includes display parameters used to display the business entity on user side.

13. The article of claim 10, wherein the CRM program object related to the business entity includes de-serialized entity instance data.

14. The article of claim 13, further comprising program instructions that when executed, cause the system to:
serialize the de-serialized entity instance data; and
create a client side proxy using the serialized entity instance data.

15. A data feed generator system, comprising:
at least one hardware processor;
a customer relationship management (CRM) application to receive a request from a CRM application client at a second computing device to transmit a CRM program object to the CRM application client via a Really Simple Syndication (RSS) feed, the CRM program object comprising a set of data from a CRM database, the set of data related to a business entity of a CRM system and
a definition module, executed by the at least one hardware processor, to define scope and attributes of the set of data, wherein
the scope comprises a number of data fields, an identification of a data source providing the data fields, and names of the data fields of the set of data from the CRM database and
the attributes comprise information about which of the data fields are sortable, and update times for field values of the set of data from the CRM database;
a feed definition generation module, executed by the at least one hardware processor, to generate a feed definition using the defined scope and the defined attributes of the set of data;
a feed conversion module, executed by the at least one hardware processor, to convert the feed definition to the RSS feed by defining a query based on the feed definition, obtaining query results via executing the query on the CRM database and converting the query results in a serialized format to the RSS feed;
an entity identification module, executed by the at least one hardware processor, to identify feed-level information comprising a set of metadata indicating a type and current definition of the CRM program object, the set of metadata comprising attribute definitions, validation rules, and display information for the business entity;
a feed exposure module, executed by the at least one hardware processor, to transmit the RSS feed to the CRM application client as a serialized object having sortable attributes; and
a web interface module, executed by the at least one hardware processor, to provide an interface from the CRM application on the first computing device to the CRM application client on the second computing device, the interface to receive selections from a user of which CRM data to include in the RSS feed.

16. The data feed generator of claim 15, wherein the set of metadata includes a description element comprising:
an item identifier identifying an item of the business entity;
a hypertext markup language based synopsis of the item; and
a link element that allows the user to link to the item.

* * * * *